(12) United States Patent
Chou et al.

(10) Patent No.: US 7,447,911 B2
(45) Date of Patent: *Nov. 4, 2008

(54) ELECTRONIC IDENTIFICATION KEY WITH PORTABLE APPLICATION PROGRAMS AND IDENTIFIED BY BIOMETRICS AUTHENTICATION

(75) Inventors: Bruce C. S. Chou, Hsin Chu (TW); Li-Kuo Chiu, Taipei (TW)

(73) Assignees: Lightuning Tech. Inc., Hsinchu (TW); Aimgene Technology Co., Ltd., Taipei County (TW)

( * ) Notice: Subject to any disclaimer, the term of this patent is extended or adjusted under 35 U.S.C. 154(b) by 616 days.

This patent is subject to a terminal disclaimer.

(21) Appl. No.: 11/131,276

(22) Filed: May 18, 2005

(65) Prior Publication Data

US 2005/0210271 A1    Sep. 22, 2005

(51) Int. Cl.
*G06F 21/00* (2006.01)
(52) U.S. Cl. ............... 713/186; 713/187; 726/5; 726/27; 382/115; 382/124
(58) Field of Classification Search ............ 713/186, 713/187; 726/5, 27; 382/115, 124
See application file for complete search history.

(56) References Cited

U.S. PATENT DOCUMENTS

| | | | |
|---|---|---|---|
| 4,582,985 A * | 4/1986 | Lofberg | 235/380 |
| 5,053,608 A * | 10/1991 | Senanayake | 235/380 |
| 5,229,764 A * | 7/1993 | Matchett et al. | 340/5.52 |
| 5,623,552 A * | 4/1997 | Lane | 382/124 |
| 5,995,014 A * | 11/1999 | DiMaria | 340/5.52 |
| 6,011,858 A * | 1/2000 | Stock et al. | 382/115 |
| 6,167,517 A * | 12/2000 | Gilchrist et al. | 713/186 |
| 6,208,264 B1 * | 3/2001 | Bradney et al. | 340/5.2 |
| 6,213,403 B1 | 4/2001 | Bates, III | |
| 6,572,014 B1 * | 6/2003 | Lambert | 235/380 |
| 6,624,739 B1 * | 9/2003 | Stobbe | 340/5.2 |

(Continued)

FOREIGN PATENT DOCUMENTS

CN    1302018 A    7/2001

(Continued)

OTHER PUBLICATIONS

Federal Information Processing Standards Publication 190; "Guideline For The Use Of Advanced Authentication Technology Alternatives" (FIPS PUB 190); Sep. 28, 1994, pp. 1-79.*

*Primary Examiner*—Carl Colin
(74) *Attorney, Agent, or Firm*—Muncy, Geissler, Olds & Lowe, PLLC

(57) ABSTRACT

An electronic identification key to be connected to a terminal system to execute at least one specific operation. The electronic identification key includes a housing, a standard interface connector, a chip-type fingerprint sensor, an embedded AP (Application Program) memory module and a control microprocessor. The control microprocessor automatically uploads an initializing program and a fingerprint application program to the terminal system. The fingerprint sensor reads a user's fingerprint and then scanned fingerprint data and reference fingerprint data stored in the electronic key are transferred to the terminal system for comparison. When the comparison passes, the execution of the at least one specific operation, such as the remote certification, control of terminal system function, personal record retrieve operation, data protection operation, or remote file access operation, is allowed.

11 Claims, 3 Drawing Sheets

U.S. PATENT DOCUMENTS

| | | | |
|---|---|---|---|
| 6,744,910 B1 * | 6/2004 | McClurg et al. | 382/124 |
| 6,775,776 B1 * | 8/2004 | Vogt et al. | 713/186 |
| 6,819,219 B1 * | 11/2004 | Bolle et al. | 340/5.52 |
| 6,952,489 B1 * | 10/2005 | Angelo et al. | 382/124 |
| 6,990,684 B2 * | 1/2006 | Futamura et al. | 726/18 |
| 7,114,051 B2 * | 9/2006 | Guu et al. | 711/173 |
| 7,197,168 B2 * | 3/2007 | Russo | 382/125 |
| 7,274,807 B2 * | 9/2007 | Hillhouse et al. | 382/124 |
| 7,277,562 B2 * | 10/2007 | Zyzdryn | 382/124 |
| 2001/0023375 A1 | 9/2001 | Shen | |
| 2002/0097142 A1 * | 7/2002 | Janiak et al. | 340/5.53 |
| 2003/0005337 A1 | 1/2003 | Poo et al. | |
| 2003/0023882 A1 * | 1/2003 | Udom | 713/202 |
| 2003/0110389 A1 | 6/2003 | Elteto | |
| 2004/0025031 A1 * | 2/2004 | Ooi et al. | 713/186 |
| 2004/0044897 A1 * | 3/2004 | Lim | 713/186 |
| 2004/0068669 A1 * | 4/2004 | Uchida | 713/202 |
| 2004/0128520 A1 * | 7/2004 | LaCous | 713/186 |
| 2004/0208348 A1 * | 10/2004 | Baharav et al. | 382/124 |

FOREIGN PATENT DOCUMENTS

| | | |
|---|---|---|
| EP | 1204079 A1 | 8/2002 |
| GB | 2387933 A | 10/2003 |
| WO | WO-02/42887 A2 | 5/2002 |

\* cited by examiner

ELECTRONIC IDENTIFICATION KEY WITH PORTABLE APPLICATION PROGRAMS AND IDENTIFIED BY BIOMETRICS AUTHENTICATION

BACKGROUND OF THE INVENTION

1. Field of the Invention

The invention relates to an electronic identification key with portable application programs and identified by biometrics authentication, and more particularly to a storage device (electronic identification key) with a fingerprint sensor and a standard interface connected to a terminal system, and the key can be enabled according to the personal fingerprint feature. The key can be used in the remote certifications of the medical applications, the government applications, the bank applications, the e-business network transaction, and in the controlling of the function of the terminal system. Using the key in conjunction with the associated application software stored therein, the function execution authority of the terminal system and the data access authority of the storage device may be controlled.

2. Description of the Related Art

In the prior art, the exhibit, such as an identification card, a driver's license, or the like, is the simplest way to represent the personal identification, and the personal photo, characters and numbers are recorded on the exhibit. However, the identification card can be easily counterfeited, and several criminal acts have been induced accordingly.

An advanced method is to utilize the magnetic-stripe card to record the personal data. Similarly, the advanced technology makes the magnetic-stripe card be easily cracked.

The newest method is to utilize the chip card to protect the personal data. Basically, the password protection is frequently used to protect the personal data of the memory chip. However, using the password to protect the personal data is troublesome because the user tends to forget the password and the password may also be easily copied and attacked.

Meanwhile, the above-mentioned device (exclusive of the chip card) for representing the personal identification only can execute a single function and a single application.

Therefore, U.S. patent Publication No. 2003/0110389 A1 discloses an electrical personal identification device, which is similar to a portable solid memory stick and contains encrypted personal data, and the device can be directly connected to the computer system for usage. However, the electrical personal identification device also has to be opened according to the inputted password. Also, using the password to protect the personal data is troublesome because the user tends to forget the password and the password may also be easily copied and attacked.

A solution to solve the problem is to utilize the personal biometric data, such as the fingerprint, voice, signature, iris, and the like, to provide a more complete and effective way for protecting data. The advantages are that the biometric feature is always kept on the user and the user does not need to memorize the feature, the biometric feature cannot be stolen, and the fingerprint biometrics feature protection method is strict and very convenient.

Recently, owing to the invention of the chip-type fingerprint sensor, the miniaturized electrical product incorporated with the fingerprint identification device becomes the technology that can be implemented. The associated technology can be found in the following patents to one of the inventors: (a) U.S. patent application Ser. No. 10/403,052, filed on Apr. 1, 2003, entitled "CAPACITIVE FINGERPRINT SENSOR," and published on Oct. 9, 2003 as US20030190061A1; (b) U.S. patent application Ser. No. 10/434,833, filed on May 13, 2003, entitled "PRESSURE TYPE FINGERPRINT SENSOR FABRICATION METHOD," and published on Nov. 20, 2003 as 20030215976A1; (c) U.S. patent application Ser. No. 10/414,214, filed on Apr. 16, 2003, and entitled "THERMOELECTRIC SENSOR FOR FINGERPRINT THERMAL IMAGING"; and (d) U.S. patent application Ser. No. 10/638,371, filed on Aug. 12, 2003, and entitled "CAPACITIVE MICRO PRESSURE SENSING MEMBER AND FINGERPRINT SENSOR USING THE SAME". Thus, span personal applications, such as the portable electrical products with the fingerprint identification function, have been developed. For example, U.S. Pat. No. 4,582,985 issued on Apr. 15, 1986 has disclosed a personal data protection method, in which the personal data stored in the ID card device is protected by way of fingerprint authentication. The protected data stored in the card device can be outputted for the subsequent processing or authentication procedures only after the fingerprint identification procedure passes. The dimension of this device is the same as that of the generally used credit card. This device, which is a completely independent fingerprint identification device because the fingerprint capture and identification are performed in the same device, includes a fingerprint sensor, an image processing and identification module, and a memory. Although the application object thereof is to prevent the personal credit card from being counterfeited, this device has a high price because the image processing and identification module needs a high-level microprocessor, such as a 32-bit RISC processor or DSP chip, in addition to the fingerprint sensor is needed, which causes the independent identification device not easy to be popularized.

China patent CN1302018A discloses a method for controlling the reading and writing rights for a data storage device by way of fingerprint identification. This patent, however, does not distinctly mention the format and interface of the storage device.

Similarly, EP124079A1 patent discloses the data protection concept of an independent fingerprint identification module, which is the same as the '985 patent except that the communication interface of the '079 patent is the golden finger configuration that is for the SD card interface. In addition, the memory device of '079 patent has a fingerprint identification module and the data protection concept is the same as the '018 patent except that the communication interface of the '079 patent is the golden finger configuration that is for the SD card interface. Similarly, U.S. patent Publication No. US2001/0023375 A1 also discloses a fingerprint hard disk for protecting data stored in the hard disk or flash disk by way of fingerprint identification.

WO 02/42887A2 patent discloses the data protection concept of an independent fingerprint identification module, which is the same as the '985 and '079 patents except that the '887 patent utilizes the USB interface to communicate with the terminal system. This device is similar to the flash memory disk that is popular over the market, but this device has the independent fingerprint processing and identification module. So, the price of the product is high.

U.S. patent publication No. 2003/005337 discloses the data protection concept of an independent fingerprint identification module, which is the same as the '985 and '079 patents, and utilizes the USB as the communication interface, which is the same as that disclosed in the '887 patent. Similarly, the device of '337 patent is also an independent fingerprint identification device and has a high price.

In addition to the high price, the portable storage device with the USB interface, such as that disclosed in the '887 and '337 patents, serves as a flash memory disk, which cannot be used until the fingerprint application program is installed first in the terminal system. Thus, the device cannot be conveniently plugged and played, which is disadvantageous to the popularization.

GB2387933 patent also discloses an independent fingerprint identification device, which has a concept and device design almost similar to those of the '887 and '337 patents, wherein the fingerprint capture and identification are performed in the same device and the device has a high price.

Heretofore, in the above-mentioned fingerprint identification devices, the '985 patent discloses the application to the personal identification card, while the other patents are only used to protect data.

Furthermore, the disclosed patents cannot be suitable for various personal identification applications, such as the remote certifications of the medical applications, the government applications, the bank applications, the e-business network transaction, the controlling of the function of the terminal system, and even various portable application programs for personal use.

In addition, the basic requirement of the above-mentioned portable storage devices with the fingerprint identification function is to facilitate the user to connect one of these storage devices to various computer systems. However, even if the USB interface is used, the fingerprint related application program still has to be manually installed in the computer system first before it is used such that the computer system can recognize this storage device. The conventional method is to provide an optical disk to install the fingerprint related application program and enable the storage device to be used. In this case, each time when the computer systems are firstly set, the user has to carry the portable storage device together with the optical disk so that he or she can use the storage device in other computer systems.

To sum up, the object of the above-mentioned prior arts is to provide a storage device for protecting data stored therein by way of fingerprint identification. When the device is used, the user has to install the fingerprint application software in the terminal system in advance. Thus, the fingerprint application program of the storage device cannot be conveniently used in a plug-and-play manner over various computers.

Consequently, the commonly assigned U.S. patent application Ser. No. 10/998,722, filed on Nov. 30, 2004, and entitled "MEMORY STORAGE DEVICE WITH A FINGERPRINT SENSOR AND METHOD FOR PROTECTING THE DATA THEREIN", discloses a storage device using the technology to let the operation system of the terminal system automatically run the fingerprint application program and driver by, for example, simulating the public block of the memory module as a CD-ROM booting area. Thus, when the device links with the terminal system, the fingerprint application program can be automatically executed and the access region can be automatically switched to another memory region (e.g., data storage region) after the fingerprint identification passes. Consequently, the device can be used in a plug-and-play manner over various computers.

To extend the innovation technology of automatically running the fingerprint application program, the invention provides a storage device with a fingerprint sensor and various portable application programs to serve as an electronic identification key representing the personal identity so as to be used in a plug-and-play manner over various computers.

SUMMARY OF THE INVENTION

It is therefore an object of the invention to provide electronic identification key with portable application programs and identified by biometrics authentication, wherein the electronic identification key is capable of maintaining the data security according to the personal biometric data.

Another object of the invention is to provide a low-cost electronic identification key.

Still another object of the invention is to provide an electronic identification key that can be completely plugged and played without the initializing program and application program being manually installed by the user.

To achieve the above-mentioned objects, the invention provides an electronic identification key to be connected to a terminal system to execute at least one specific operation. The electronic identification key includes a housing, a standard interface connector, a fingerprint sensor, an AP (Application Program) memory module and a control microprocessor. The standard interface connector is disposed on the housing and to be connected to the terminal system. The fingerprint sensor, which is disposed on the housing, senses a fingerprint of a user. The AP memory module, which is disposed in the housing, stores a plurality of application programs and a set of reference fingerprint data. The control microprocessor is disposed in the housing and electrically connected to the standard interface connector, the fingerprint sensor and the AP memory module. The control microprocessor communicates with the terminal system by handshakes so as to upload an initializing program suitable for the terminal system to the terminal system. The terminal system automatically runs the initializing program and then displays an application program menu on a user interface such that the user can make a selection. The control microprocessor enables the terminal system to automatically run one fingerprint application program, which is suitable for the terminal system, among the application programs according to the selection made by the user on the application program menu. The control microprocessor controls the fingerprint sensor to read the fingerprint of the user to obtain scanned fingerprint data, which is transferred to the terminal system according to the fingerprint application program executing in the terminal system. The control microprocessor further transfers the set of reference fingerprint data to the terminal system. The terminal system processes the scanned fingerprint data, judges whether the scanned fingerprint data and the set of reference fingerprint data substantially match with each other, and executes the at least one specific operation if yes. At least one application program among the plurality of application programs and corresponding to the at least one specific operation is transferred to the terminal system for installation and execution.

DETAILED DESCRIPTION OF THE INVENTION

The basic architecture of the electronic identification key of the invention is a storage device with a USB interface, and the size of the electronic identification key is almost the same as that of a flash disk. The standard USB interface is used to be connected to the terminal system, especially the computer system, without any card reading device. The electronic identification key has the following advantages. Because the fingerprint processing and identification are performed by the processor of the terminal system, the hardware cost of the electronic identification key may be greatly reduced, and the electronic identification key may be popularized. Furthermore, because the fingerprint application programs for personal identity are stored in the storage, the electronic identification key of the invention can be used in a plug and play manner (automatically running) over various terminal systems within various operation systems and language environments without manually installing any initializing program or application software in the terminal systems first. Meanwhile, the data and programs stored in the non-volatile memory of the electronic identification key are encrypted according to the personal fingerprint feature, so the correct format and content cannot be acquired even if the memory is de-mounted. The details and applications of the key of the invention will be described with reference to the accompanying drawings.

Figure 1:
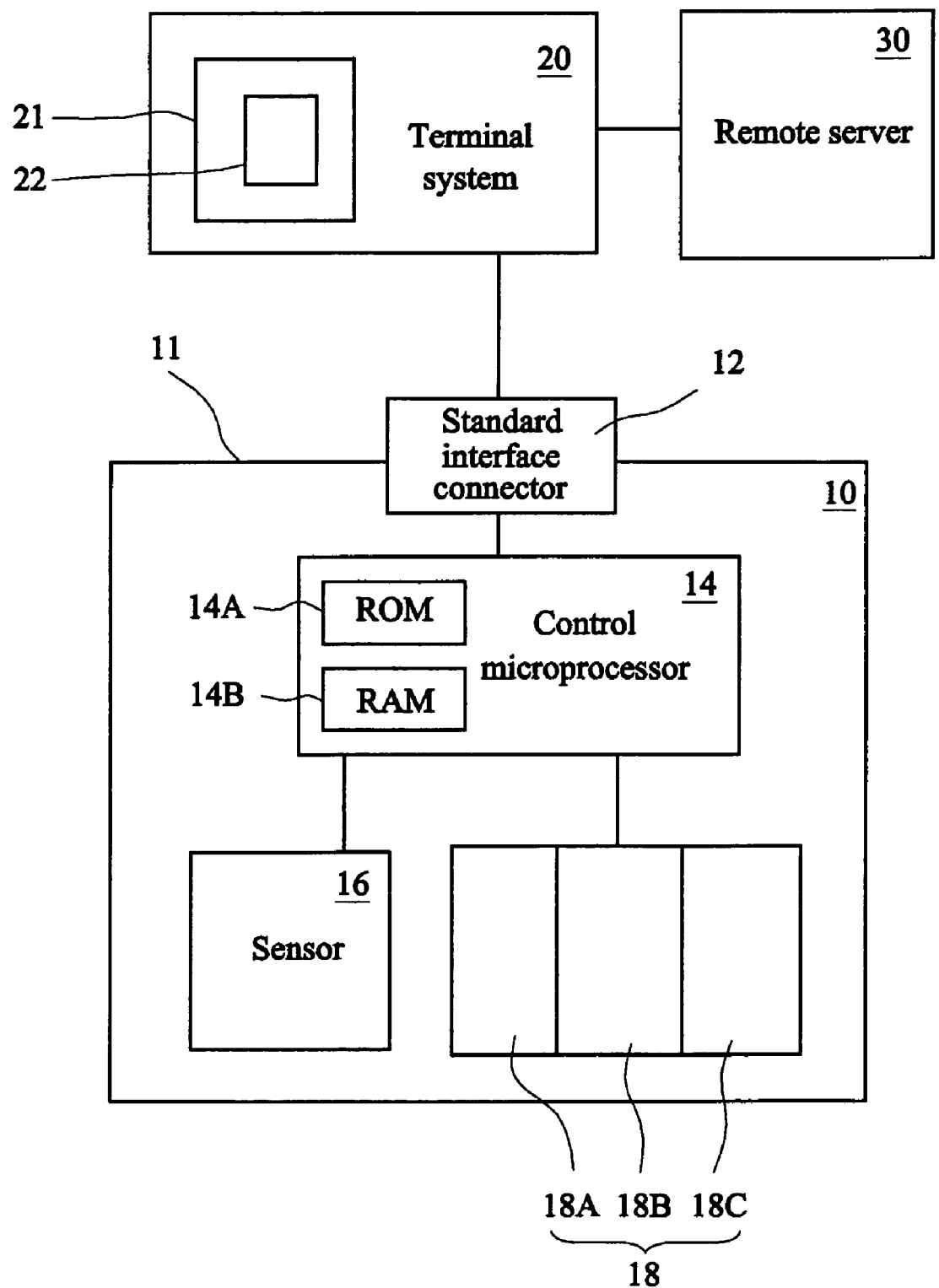
FIG. 1 is a block diagram showing an electronic identification key according to a preferred embodiment of the invention.

FIG. 1 is a block diagram showing an electronic identification key according to a preferred embodiment of the invention. As shown in FIG. 1, the electronic identification key 10 of this embodiment is to be connected to a terminal system 20 to execute at least one specific operation. The terminal system 20 may be, for example, a computer, a PDA or a mobile phone. The electronic identification key 10 includes a housing 11, a standard interface connector 12, a fingerprint sensor 16, an AP (Application Program) memory module 18 and a control microprocessor 14. The fingerprint sensor 16 may be particularly the capacitive, thermoelectric or pressure type fingerprint sensor disclosed in the above-mentioned patents to one of the inventors.

The standard interface connector 12 is disposed on the housing 11 and to be connected to the terminal system 20. The fingerprint sensor 16 is disposed on the housing 11 to sense a fingerprint of a user. Typically, when the user uses the key at the first time, the fingerprint sensor may be enabled to read the fingerprint, which is then processed into a set of reference fingerprint data, which may include multiple reference fingerprint data records of a single authorized user, or multiple reference fingerprint data records of multiple authorized users.

The AP memory module 18, which is disposed in the housing 11, stores a plurality of application programs and the set of reference fingerprint data. Preferably, the application programs can adapt the electronic identification key 10 to various operation systems and language environments in various terminal systems.

The control microprocessor 14 is disposed in the housing 11 and electrically connected to the standard interface connector 12, the fingerprint sensor 16 and the AP memory module 18. In this embodiment, the control microprocessor 14 further includes a ROM (Read Only Memory) 14A and a RAM (Random Access Memory) 14B. The ROM 14A stores the firmware for the terminal system 20 to be plugged and played. The firmware stored in the ROM 14A enables the terminal system 20 to automatically run the initializing program of the electronic identification key 10, and automatically links with various application programs stored in the AP memory module 18. Then, the programs may be automatically run in the terminal system 20 to execute the personal identification and then the application programs. The RAM 14B provides a buffer for the data processing. The initializing program can be stored in the ROM 14A as well as the AP memory module 18.

Thus, when the electronic identification key 10 is connected to the terminal system 20, the control microprocessor 14 communicates with the terminal system 20 by handshakes so as to upload an initializing program suitable for the terminal system 20 to the terminal system 20. Meanwhile, the terminal system 20 can judge whether or not the electronic identification key 10 is used at the first time. If yes, the application program stored in the electronic identification key 10 is first executed to read the fingerprint and complete the file creation of the set of reference fingerprint data. When the electronic identification key 10 has to be enabled using the fingerprint, the terminal system 20 automatically runs the initializing program and then displays an application program menu 22 on a user interface 21 (e.g., a display) for the user to make a selection. The control microprocessor 14 uploads one of the plurality of application programs and the terminal system 20 automatically runs this program according to the selection, and uploads the set of reference fingerprint data to the terminal system 20. Alternatively, the set of reference fingerprint data also can be uploaded to the terminal system 20 after the fingerprint sensor 16 has scanned the fingerprint.

Then, the control microprocessor 14 controls the fingerprint sensor 16 to read a user's fingerprint according to the fingerprint application program executing in the terminal system 20, so as to transfer scanned fingerprint data (and the set of reference fingerprint data) to the terminal system 20. The terminal system 20 processes the scanned fingerprint data, and judges whether or not the scanned fingerprint data substantially matches with the set of reference fingerprint data. If yes, the at least one specific operation is executed, wherein at least one of the plurality of application programs corresponding to the at least one specific operation is transferred to the terminal system 20 for installation and execution.

The above-mentioned at least one specific operation includes, without limitation to, at least one of the following operations of a remote certification operation, a control of terminal system function, a personal record retrieve operation, a data protection operation and a remote file system access operation.

In this embodiment, the AP memory module 18 is preferably a one-time programmable (OTP) memory in order to save the cost of the electronic identification key such that the key may be popularized. In another embodiment, the AP memory module 18 may be a NOR flash memory, a NAND flash memory or other non-volatile memories or even the small size hard drive.

The maximum feature of the invention is that the AP memory module 18 may be divided into several blocks 18A, 18B and 18C for respectively storing a set of reference fingerprint data, a set of fingerprint processing application programs, at least one set of specific function application programs, and a set of personal data such as the name, address, ID number, birthday, and the like. So, the key of the invention can provide various identification key applications with the extension of the application programs and can achieve the multiple functions. Thus, the cost may be greatly reduced. The set of fingerprint processing application program can further provide the functions of encrypting and decrypting the fingerprint and the personal data.

In still another embodiment of the invention, the above-mentioned integrated circuit devices also may be integrated on a single chip, which is helpful to the cost reduction and the product dimension reduction. The standard interface connector 12, which may be a universal serial bus (USB) interface, a PCMCIA interface, a PCI EXPRESS interface, an IEEE 1394 interface or other standard interfaces, is connected to the control microprocessor 14 and the terminal system 20.

The applications of the electronic identification key of the invention will be described in the following. The applications of the invention may be selected from at least one of the following applications.

1. Remote Certification Operation

The network age induces a lot of demands on remote certification using the current art of, for example, the digital signature. However, the safety level thereof is still lower than that of the biometric feature identification.

When the electronic identification key 10 is used, the key 10 has to be connected to the terminal system 20 such as a computer, which automatically runs the initializing program and links with the application program menu 22 to display the menu 22 on the user interface 21 such as a display. When the user selects the remote certification function, the electronic identification key 10 enables the computer to automatically run the fingerprint application program, which displays a wizard on the display to request the user to make the identification. After the user has inputted his or her fingerprint through the fingerprint sensor 16 provided by the electronic identification key 10, and the scanned fingerprint substantially matches with the reference fingerprint data stored previously in the electronic identification key 10, the electronic identification key 10 enables the computer to automatically run the remote certification application program, and links with a remote server 30 in a place, such as a government office, a bank, a stock exchange center, a medical system, a company, through the network and the computer. For the sake of the consideration of safety, the remote authentication can further transfer the encrypted reference fingerprint data to the remote server, which compares the encrypted reference fingerprint data with a second reference fingerprint data stored in the remote server. Herein, the second reference fingerprint data is also referred to as the advanced fingerprint data, which is generated by reading the fingerprint data of the authorized user in the issuing place when the electronic identification key is issued. Thus, the remote certification of the invention includes two times of fingerprint identification to increase the safety level.

In brief, in the remote certification operation, the terminal system 20 transfers the scanned fingerprint data or the set of reference fingerprint data to the remote server 30 communicating with the terminal system 20 according to a result that the scanned fingerprint data substantially matches with the set of reference fingerprint data. The remote server 30 judges whether the scanned fingerprint data or the set of reference fingerprint data substantially matches with a set of advanced fingerprint data stored therein. If yes, an authentication-pass result is outputted to the terminal system 20 to complete the authentication procedure.

2. The Control of Terminal System Function

When the electronic identification key 10 is used, the key 10 is connected to the terminal system 20 such as a computer, which automatically runs the initializing program and links with the application program menu 22 to display the menu 22 on the user interface 21 such as a display. When the user selects the control of terminal system function, the electronic identification key 10 enables the computer to automatically run the fingerprint application program, and the computer displays a wizard on the display to request the user to make the identification. After the user has inputted his or her fingerprint through the fingerprint sensor 16 provided by the electronic identification key 10, and the scanned fingerprint substantially matches with the reference fingerprint data stored previously in the electronic identification key 10, the electronic identification key 10 enables the computer to automatically run the control application program of terminal system function, and the computer can protect the data in the hard disk from being accessed by unauthorized user, disable/enable all or a part of the functions of the computer (e.g., the keyboard, the mouse, the hard disk drive or the optical disk drive may be enabled or disabled), or disable/enable a part of the software functions. In this case, the terminal system 20 cannot be partially or completely used if the electronic identification key 10 does not exist.

In brief, the control of terminal system function is to disable or enable an electrical device of the terminal system 20 according to the result that the scanned fingerprint data substantially matches with the set of reference fingerprint data.

3. Personal Record Retrieve Operation

When some patients, especially the children, the old men with Parkinson disease, or other chronic disease patients, have forgotten the way to go home or fainted away on the street, the personal record stored in the electronic identification key 10 may be opened. The electronic identification key 10 may contain other identification data to facilitate the patients to see a doctor or go home. Alternatively, in order to disable others from knowing the case history, only the patient or his/her visiting staff can open his/her medical record, and the reference fingerprint of the visiting staff may be enrolled in the key.

In brief, the personal record retrieve operation retrieves the personal record stored in the AP memory module 18 according to the result that the scanned fingerprint data substantially matches with the set of reference fingerprint data.

4. Data Protection Operation

In addition, the electronic identification key 10 may be used as a typical storage medium to execute the data protection operation. For example, the electronic identification key 10 may be made into a portable solid state disk, and the data cannot be accessed until the fingerprint authentication passes. The data protection operation selectively protects the electric data stored in the AP memory module 18 according to the result that the scanned fingerprint data substantially matches with the set of reference fingerprint data.

5. Remote File System Access Operation

In the frequent remote file system access operations, such as the FTP (File Transmission Protocol) and the E-mail operations, the user can access the remote file system FTP server or E-mail server through the network using the terminal system connected to the network, and automatically transfer the user data, such as the name and password, to read, modify, delete, receive, or send the personal file or E-mail.

When the electronic identification key 10 is used, the key is connected to the terminal system 20 such as a computer, which automatically runs the initializing program and links with the application program menu 22 and displays the menu on the user interface 21 such as a display. When the user selects the remote file system access operation, the electronic identification key 10 enables the computer to automatically run the fingerprint application program, and the computer displays a wizard on the display to request the user to make the identification. After the user has inputted his or her fingerprint through the fingerprint sensor 16 provided by the electronic identification key 10, and the scanned fingerprint substantially matches with the reference fingerprint data stored previously in the electronic identification key 10, the electronic identification key 10 enables the computer to automatically run the E-mail receiving and sending program so as to receive and send the E-mail, or automatically downloads the FTP program to execute the remote file access operation. The terminal system 20 also may be connected to a mail server or a FTP server through the network, and the electronic key 10 also stores a set of E-mail account and password or FTP account and password corresponding to the set of reference fingerprint.

In brief, the electronic key 10 can selectively access the remote file corresponding to the set of remote file account of the set of reference fingerprint data through the terminal system and the network according to the result that the scanned fingerprint data substantially matches with the set of reference fingerprint data. The set of remote file account may include a plurality of accounts, and the accessed remote file is stored in the AP memory module.

In addition, the electronic identification key can further provide the PKI function used in the current chip cards, and the authorization method is compatible with those of the current chip cards. In this case, the fingerprint can replace the password needed in the current chip cards, and the key is an independent identification device, and the control microprocessor 14 may further process and judge whether or not the scanned fingerprint data substantially matches with the set of reference fingerprint data, and then performs the PKI procedure to the terminal system 20 if yes.

Figure 2:
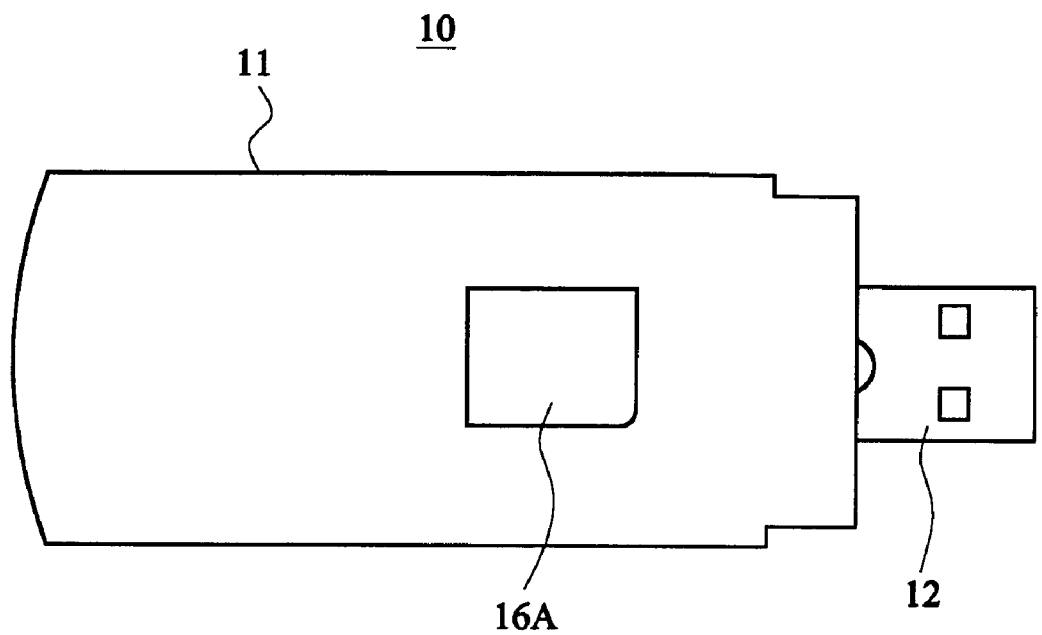
FIG. 2 is a top view showing the electronic identification key with an area-type fingerprint sensor.
Figure 3:
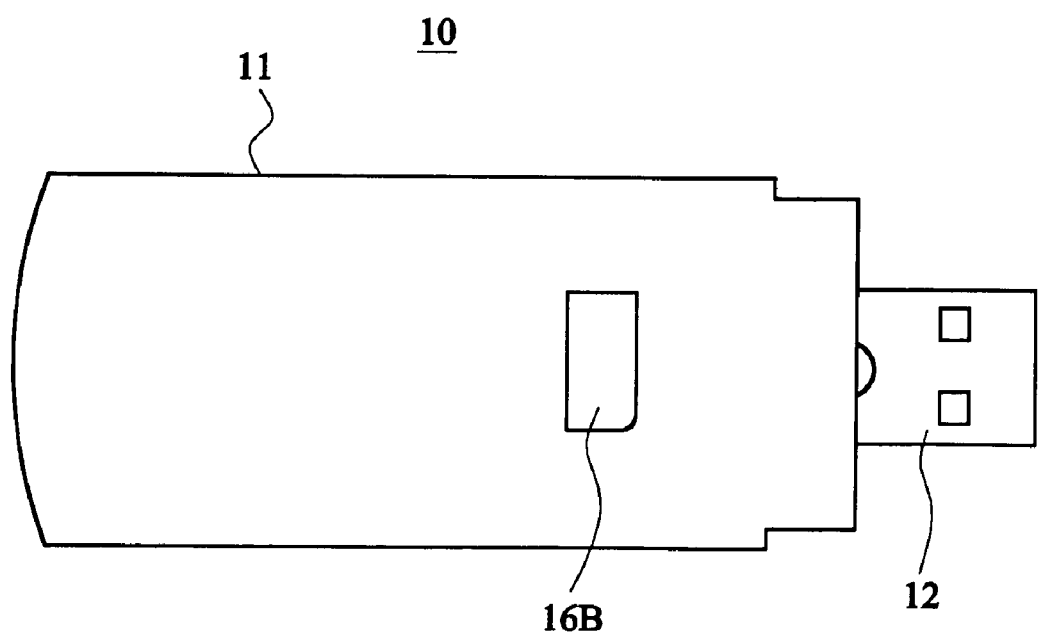
FIG. 3 is a top view showing the electronic identification key with a sweep-type fingerprint sensor.

FIGS. 2 and 3 are top views showing the electronic identification keys with an area-type fingerprint sensor and a sweep-type fingerprint sensor. As shown in FIG. 2, the electronic identification key 10 has an area-type fingerprint sensor 16A. The fingerprint of the user can be read when the user's finger is motionlessly placed on the area-type fingerprint sensor 16A. As shown in FIG. 3, the electronic identification key 10 has a sweep-type fingerprint sensor 16B. The fingerprint of the user can be read when the user's finger sweeps over the sweep-type fingerprint sensor 16B.

Figure 4:
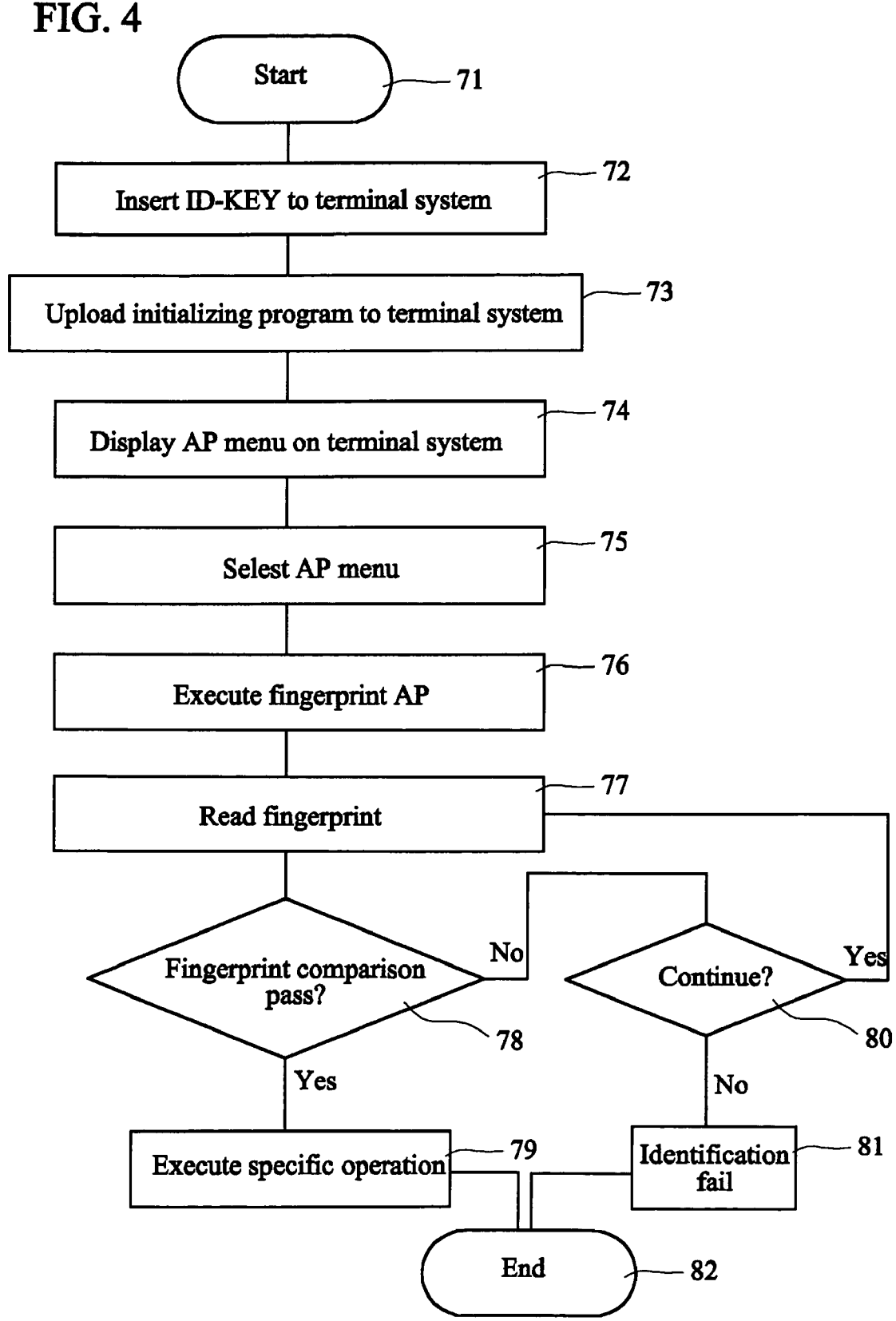
FIG. 4 is a flow chart showing a control method for the electronic identification key according to the preferred embodiment of the invention.

FIG. 4 is a flow chart showing a control method for the electronic identification key according to the preferred embodiment of the invention. As shown in FIGS. 4 and 1, the method for controlling the electronic identification key of the invention includes the following steps. First, after the starting procedure in step 71, the user inserts the electronic identification key (ID-KEY) 10 to the terminal system 20 (step 72) so as to enable the control microprocessor 14 of the electronic identification key 10 to communicate with the terminal system 20 by handshakes. Then, the initializing program, which is suitable for the terminal system 20 and stored in the electronic identification key 10, is uploaded to the terminal system 20 (step 73). The terminal system 20 automatically runs the initializing program and then displays an application program menu 22 on a user interface 21 for the user to make a selection (step 74). The control microprocessor 14 uploads the fingerprint application program, which is suitable for the terminal system 20 and stored in the AP memory module 18, to the terminal system 20 for automatically running the program (step 76) according to the selection made by the user on the application program menu 22 (step 75). Then, the control microprocessor 14 controls the fingerprint sensor 16 of the electronic identification key 10 to read a user's fingerprint according to the fingerprint application program executing in the terminal system 20, so as to transfer the scanned fingerprint data and the set of reference fingerprint data to the terminal system 20 (step 77). Then, the terminal system 20 processes the scanned fingerprint data and judges whether or not the scanned fingerprint data substantially matches with the set of reference fingerprint data (step 78). If yes, the at least one specific operation is executed (step 79), and then the procedure ends (step 82). If no, the terminal system asks the user whether he or she wants to try again and continues the identification process (step 80). If the user wants to continue the identification process, the procedure goes back to step 77; or otherwise the system displays a message of identification failure (step 81), and the procedure ends (step 82). The specific operation has been described hereinabove, and detailed descriptions thereof will be omitted. It is to be noted that another function of password identification also can be added to the menu in step 74 according to the design requirements such that the user can choose to input the password in conjunction with the fingerprint identification, or choose one of the password input and the fingerprint identification.

According to the electronic identification key and control method of the invention, it is possible to integrate various control operations with fingerprint identification on a single device so that the data security maintenance and the function control of the terminal system can be made according to the personal biometric data. In addition, because the read fingerprint is processed in the terminal system, the electronic identification key of the invention does not need a processor with powerful functions, and the cost of the key can be effectively reduced. Furthermore, because various application programs or initializing programs are stored in the AP memory module and the function of the control microprocessor is powerful, the electronic identification key of the invention can be completely plugged and played without the initializing program and application program being manually installed by the user. Thus, the key can be conveniently used.

While the invention has been described by way of examples and in terms of preferred embodiments, it is to be understood that the invention is not limited to the disclosed embodiments. To the contrary, it is intended to cover various modifications. For example, this storage device with portable application programs may also store some personal editing software, e-mail software, internet software, plotting software, or the like, together with the personal settings. Thus, the storage device may be used in a plug-and-play manner over the computers of others. Therefore, the scope of the appended claims should be accorded the broadest interpretation so as to encompass all such modifications.

What is claimed is:

1. An electronic identification key to be connected to a terminal system to execute at least one specific operation, the electronic identification key comprising:

a housing;

a standard interface connector disposed on the housing and to be connected to the terminal system;

a fingerprint sensor, which is disposed on the housing, for sensing a fingerprint of a user;

an AP (Application Program) memory module, which is disposed in the housing, for storing a plurality of application programs and a set of reference fingerprint data; and a control microprocessor disposed in the housing and unremovably electrically connected to the standard interface connector, the fingerprint sensor and the AP memory module, wherein:

the control microprocessor communicates with the terminal system by handshakes so as to upload an initializing program, which is suitable for the terminal system, from the electronic identification key to the terminal system, and the terminal system automatically runs the initializing program and then displays an application program menu on a user interface such that the user can make a selection;

the control microprocessor enables the terminal system to automatically run one fingerprint application program, which is suitable for the terminal system, among the application programs according to the selection made by the user on the application program menu;

the control microprocessor controls the fingerprint sensor to read the fingerprint of the user to obtain scanned fingerprint data, which is transferred to the terminal system according to the fingerprint application program executing in the terminal system;

the control microprocessor further transfers the set of reference fingerprint data to the terminal system; and the terminal system processes the scanned fingerprint data, judges whether the scanned fingerprint data and the set of reference fingerprint data substantially match with each other, and executes the at least one specific operation if yes, wherein at least one application program among the plurality of application programs and corresponding to the at least one specific operation is transferred from the AP memory module to the terminal system for installation and execution.

2. The electronic identification key according to claim 1, wherein the at least one specific operation is selected from at least one of the group consisting of:

a remote certification operation, in which the terminal system selectively transfers the scanned fingerprint data to a remote server, communicating with the terminal system according to a result that the scanned fingerprint data substantially matches with the set of reference fingerprint data, and the remote server judges whether or not the scanned fingerprint data substantially matches with a set of advanced fingerprint data stored in the remote server, and outputs an authentication-pass result to the terminal system;

a control of terminal system function for partially or completely disabling or enabling an electrical device in the terminal system selectively according to the result that the scanned fingerprint data substantially matches with the set of reference fingerprint data;

a personal record retrieve operation for selectively retrieving a personal record stored in the AP memory module according to the result that the scanned fingerprint data substantially matches with the set of reference fingerprint data;

a data protection operation for selectively protecting electric data stored in the AP memory module according to the result that the scanned fingerprint data substantially matches with the set of reference fingerprint data; and a remote file access operation for selectively accessing a remote file for a remote file account corresponding to the set of reference fingerprint data through the terminal system and a network according to the result that the scanned fingerprint data substantially matches with the set of reference fingerprint data, and the accessed remote file is stored in the AP memory module.

3. The electronic identification key according to claim 2, wherein the electrical device is a keyboard, a mouse, a hard disk drive or an optical disk drive.

4. The electronic identification key according to claim 2, wherein the set of reference fingerprint data comprises reference fingerprint data records corresponding to a plurality of authorized users.

5. The electronic identification key according to claim 2, wherein the standard interface connector is a universal serial bus (USB) interface, a PCMCIA interface, or an IEEE 1394 interface.

6. The electronic identification key according to claim 2, wherein the fingerprint sensor is an area-type fingerprint sensor or a sweep-type fingerprint sensor.

7. The electronic identification key according to claim 2, wherein the initializing program is stored in the AP memory module or a ROM of the control microprocessor.

8. The electronic identification key according to claim 2, wherein the AP memory module is a one-time programmable (OTP) memory, a NOR memory, or a NAND memory.

9. The electronic identification key according to claim 2, wherein the AP memory module has a plurality of blocks for separately storing the plurality of application programs and the set of reference fingerprint data.

10. The electronic identification key according to claim 2, wherein the AP memory module further stores a set of personal identification data.

11. The electronic identification key according to claim 1, wherein the control microprocessor can further process and judge whether or not the scanned fingerprint data substantially matches with the set of reference fingerprint data, and outputs an identification number to the terminal system if the scanned fingerprint data substantially matches with the set of reference fingerprint data.

* * * * *